United States Patent [19]

Johnston, Jr. et al.

[11] 4,272,158
[45] Jun. 9, 1981

[54] BROADBAND OPTICAL DIODE FOR A RING LASER

[75] Inventors: Thomas F. Johnston, Jr., Sunnyvale; William P. Proffitt, San Jose, both of Calif.

[73] Assignee: Coherent, Inc., Palo Alto, Calif.

[21] Appl. No.: 16,687

[22] Filed: Mar. 2, 1979

[51] Int. Cl.³ .......................... G02F 1/09; G01B 9/02
[52] U.S. Cl. .................................. 350/375; 350/400; 356/350; 331/94.5 C
[58] Field of Search ............... 350/151, 152, 157, 355; 356/350; 331/94.5 C, 94.5 S, 94.5 T

[56] References Cited

U.S. PATENT DOCUMENTS

| 2,078,771 | 4/1937 | Myers | 350/150 |
|---|---|---|---|
| 3,360,323 | 12/1967 | Weisman et al. | 350/151 |
| 3,649,931 | 3/1972 | Macek | 350/151 |
| 3,862,803 | 1/1975 | Yntema et al. | 356/350 |
| 3,963,995 | 6/1976 | Jacob | 350/151 |

OTHER PUBLICATIONS

Jarrett et al., "High-Efficiency Single-Frequency CW Ring Dye Laser", Optics Letters 6-1979, pp. 176-178.
Johnston Jr. et al., "Design & Performance of a Broad-Band Optical Diode to Enforce One-Direction Traveling-Wave Operation of a Ring Laser", IEEE Jr. of Quantum Electronics, 4-1980, pp. 483-488.
Jarrett et al., "High-Efficiency Single-Frequency CW Ring Dye Laser", 10th Internat. Quantum Electronics Conf., Digest of Tech. Papers, Optical Soc. of America, 1978, Conf. 5-29 to 6-1 1978.

*Primary Examiner*—William H. Punter
*Attorney, Agent, or Firm*—Limbach, Limbach & Sutton

[57] ABSTRACT

A broadband optical diode consists of a Faraday element within a magnetic field and an optically active element. The materials and dimensions of the Faraday element and the optically active element are chosen so that their polarization rotations approximately match over a broad wavelength span, with the rotation angles and the mismatch between them specified by the conditions that the forward wave insertion loss does not exceed a maximum specified value, and the differential loss between forward and backward traveling waves is not less than a minimum specified value.

10 Claims, 6 Drawing Figures

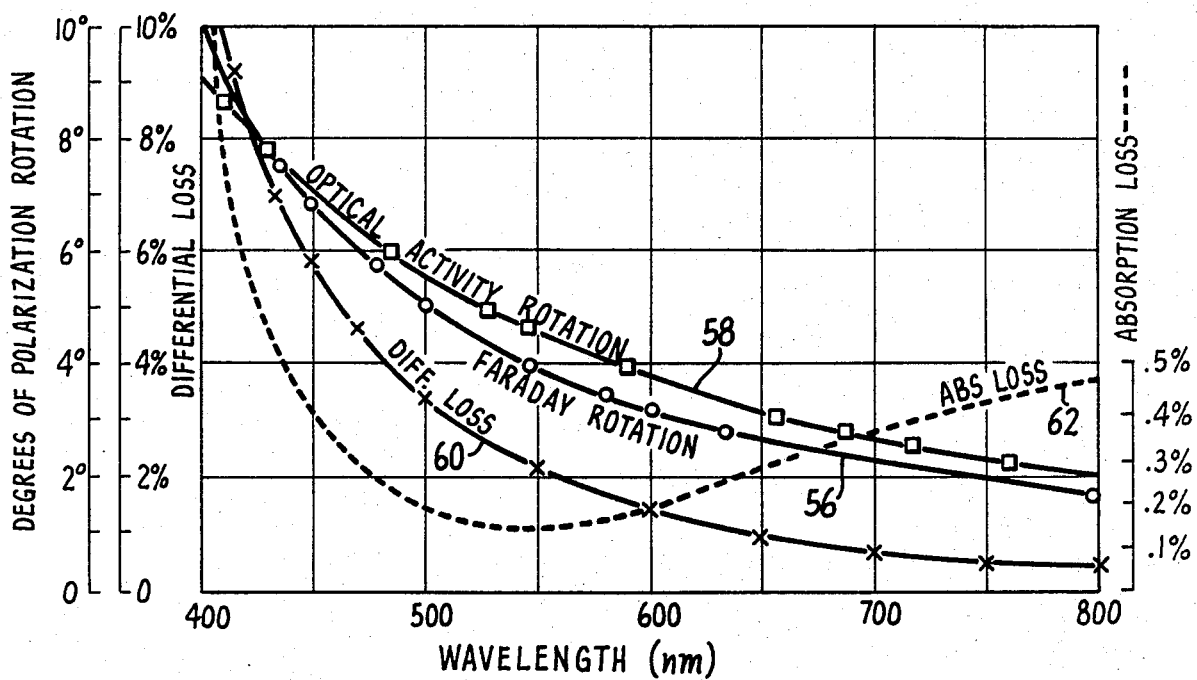
FIG. 3.
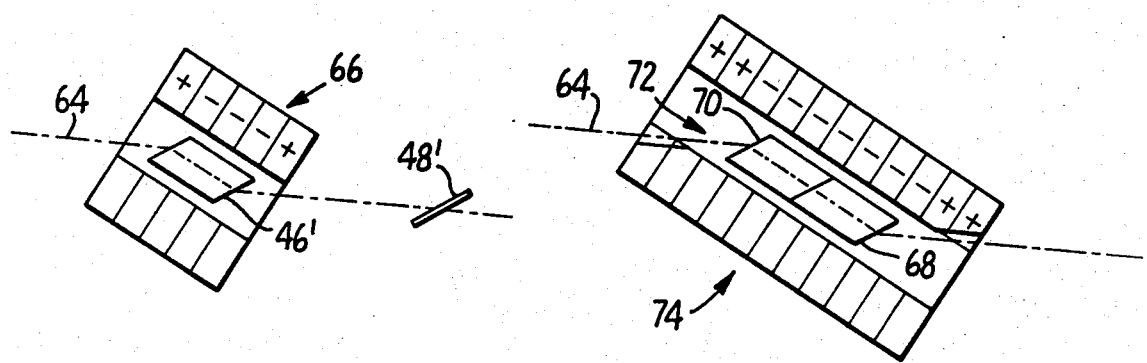
FIG. 4.
FIG. 5.

BROADBAND OPTICAL DIODE FOR A RING LASER

BACKGROUND OF THE INVENTION

Traveling-wave CW ring dye lasers are capable of several watt single-frequency outputs because they may be pumped with the full power of available ion lasers. In contrast, an input power limit exists in a standing-wave or linear cavity dye laser due to the regions of unsaturated gain in the pumped volume of the dye jet at the nodes of the standing wave. It has been shown that the fraction of the total volume the unused portion represents, decreases as the dye beam intensity increases. The drop in volume, however, is less rapid than the linear rise in pump power. Thus a mode at a second frequency, which has antinodes where the first mode has nodes, must eventually reach threshold and oscillate as the pump level is increased in the standing wave case.

This limit does not exist in a ring laser, and typically a ring is pumped four times harder than a standing wave laser. Thus, a typical output power specification for a single frequency standing-wave laser is 150 mW output, using a 3 W argon ion laser as an optical pump operating at a wavelength of 514 nm, and using Rhodamine 6G dye as the lasing medium. A ring dye laser, however, can provide 1 W single-frequency output with a 6 W input pump beam. This is a major advantage of the ring configuration.

A second major advantage of a ring configuration is that the internal second-harmonic generation powers that can be attained are an order-of-magnitude greater than possible in a standing-wave configuration.

A ring laser cavity typically employes a four mirror, figure-eight configuration to keep the fold angles small, allowing astigmatic compensation with a Brewster plate of reasonable thickness. An important optical element in a ring laser is the "optical diode," a device which forces the laser to operate stably in the preferred, or forward traveling-wave direction. Obviously, the output beam is unusable if it randomly switches direction from horizontal, to several degrees below horizontal, which it does without an optical diode as the beam direction around the ring switches from forward to backward.

A typical optical diode consists of a Faraday cell surrounded by samarium-cobalt permanent magnets and a section of quartz-crystal cut for optical activity. (See S. M. Jarrett and J. F. Young, Paper D3, Digest of Technical Papers, Tenth IQEC, Atlanta, Ga (May 29-June 1, 1978), p. 634). The rotation of polarization of the dye beam through a small angle in the transit of the Faraday cell is "undone" for the forward wave in traversing the crystal. The backward wave undergoes a polarization rotation of approximately double the Faraday angle in transit of this pair of elements, and suffers a subsequent reflection loss at the Brewster surfaces in the cavity.

Both the Faraday rotation angle for a fixed magnetic field, and the rotation angle from the optically active plate, vary roughly as the inverse-square of the wavelength. The problem in designing a wide-band optical diode is one of keeping a close enough match of the Faraday and back-rotation angles to have an acceptably low insertion loss for the forward wave on the blue end of the useful spectrum, and at the same time to have enough Faraday rotation remaining on the red end to give the minimum required differential loss between forward and backward waves.

Existing optical diodes for ring lasers are limited in their spectral range. Further existing optical diodes typically use anti-reflection coated, normal incidence surfaces which limits operation, in any case, to the relatively narrow low-reflectivity band pass of the coating.

SUMMARY OF THE INVENTION

It is therefore an object of the invention to provide a broadband optical diode for a ring laser. Another object of the invention is to provide an optical diode for a dye ring laser capable of satisfactory performance over a wide spectral range.

In accordance with the present invention, a broadband optical diode includes a non-reciprocal element, i.e., Faraday element and a reciprocal element, such as an optically active material, whose polarization rotation and reciprocal polarization rotation, respectively, meet two criteria. First, the forward wave insertion loss must be less than a specified maximum value. Secondly, the minimum differential loss between forward and backward waves, must be greater than a specified minimum value.

The maximum forward wave insertion loss has been found to be about 0.1%, and the minimum differential loss, to insure one-way oscillation, is about 0.4%. It will be shown that to achieve the 0.1% insertion loss criteria, the difference between the rotation of the Faraday material and optically active material, must not exceed 1.8°. It will also be shown that, to achieve the 0.4% differential loss criteria, four times the product of the Faraday polarization rotation angle and the optically active polarization rotation angle, must exceed the 0.4% figure. (If these two angles are equal, the minimum Faraday polarization rotation is 1.8°.)

The particular Faraday material and its length, the magnetic field used with the Faraday material, and the dimension of the optically active, reciprocal rotation element, are chosen to maximize the wavelength span over which the two criteria set forth above are met.

In accordance with another aspect of the present invention, the reciprocal element, which can be an optically active material, and the non-reciprocal element, i.e., Faraday element, are inserted in the cavity at Brewster's angle of incidence to the laser beam. This avoids the necessity for anti-reflection coatings at the entrance and exit surfaces, which limits the diode bandwidth to the coating bandwidth.

In accordance with another aspect of the invention the reciprocal and Faraday elements are combined into a single, unified member by optically contacting a piece of right-handed crystal quartz to a piece of left-handed crystal quartz of a slightly different dimension.

This arrangement has several advantages. First, fewer optical surfaces are introduced in the laser cavity. Secondly, the optical activity and Faraday rotation remain matched over all wavelengths for which quartz is transparent. Third, there is less insertion loss than a 2-piece diode, since the latter has additional reflection losses for the forward wave at the inner surfaces between the Faraday cell, and the reciprocal rotation element.

BRIEF DESCRIPTION OF THE DRAWINGS

FIG. 3 is a graphical representation of optical notations, and the resultant difference in losses between forward and backward waves, as a function of the wavelength of the light transmitted through the two parts of an optical diode in accordance with the present invention;

FIG. 4 is one embodiment of an optical diode in accordance with the present invention;

FIG. 5 is another embodiment of an optical diode in accordance with the present invention.

DESCRIPTION OF THE PREFERRED EMBODIMENT

Figure 1:
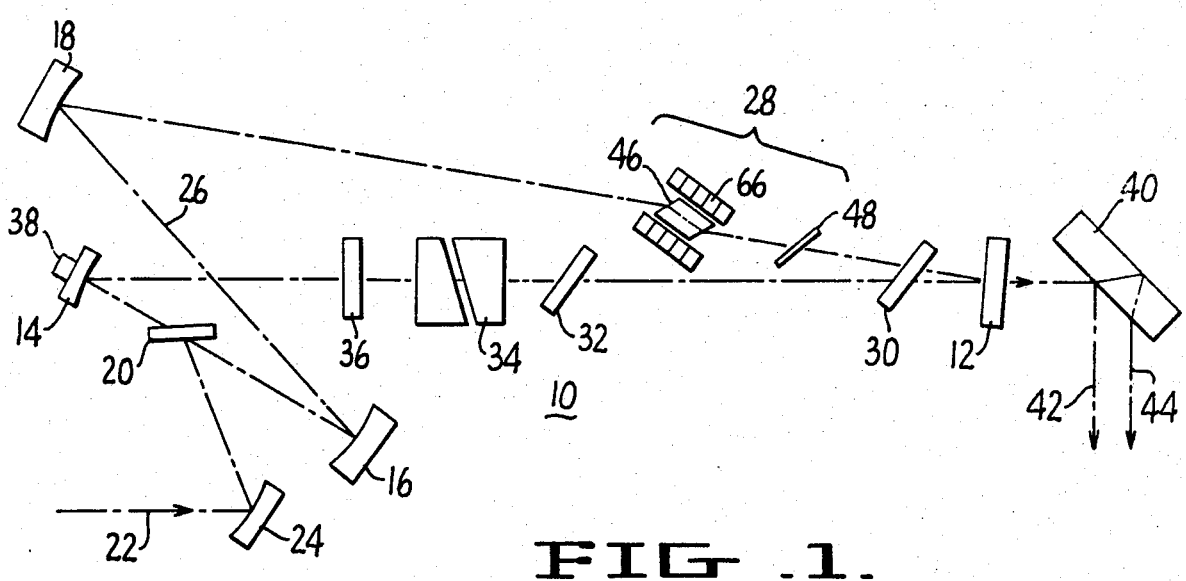
FIG. 1 is an optical schematic of a ring laser.

The optical schematic of a typical ring dye laser 10 is shown in FIG. 1. The optical cavity comprises four mirrors 12, 14, 16 and 18 forming a figure-eight configuration. The purpose of the figure-eight configuration is to keep the fold angles small, allowing astigmatic compensation of concave mirrors 14, 16 and 18. The three mirrors 14, 16 and 18 are all of high reflectivity while mirror 12 is the output coupler allowing some of the ring dye laser light to pass through it.

The two concave mirrors 14 and 16 focus the dye laser beam to a narrow waist, at which point, an unsupported liquid dye stream 20 is injected in the well-known manner, into the ring laser path. The liquid dye is the active lasing material in the laser. The dye stream 20 is optically pumped by another laser (not shown) such as a continuous wave argon ion laser. Its output beam 22 is directed at a pump mirror 24 to intersect the dye stream 20.

Reflecting mirrors 16 and 18 are concave to provide an auxiliary focus point or "waist" 26 within the dye laser cavity. Auxiliary waist 26 can be used to mount intercavity experiments, such as frequency doubling in a non-linear crystal to produce suitable ultra-violet radiation. Unidirectional lightwave propogation is provided by optical diode 28, which is described in greater detail subsequently.

There are several optical tuning elements within the ring dye laser optical cavity 10. Coarse tuning of the dye laser is done by a birefringent filter 32. Such a filter is described in U.S. Pat. No. 3,868,592 entitled "Improved Tuning Apparatus for a Dye Laser".

Additional cavity tuning elements include a thick etalon 34, a thin etalon 36, a tipping Brewster plate 30 and a piezo-electric drive 38 for fold mirror 14. Thick etalon 34 is described in U.S. Pat. Nos. 4,081,760 and 4,097,818. These three optical elements, as well as the tipping Brewster plate 30, are controlled to selectively tune the dye laser to a predetermined output frequency and to maintain that output frequency despite momentary perturbations of laser operation. Such a control system is described in U.S. Pat. No. 4,150,342 entitled "Method and Apparatus for Automatically Reacquiring a Predetermined Output Radiation in a Tunable Laser," assigned to the same assignee as the present invention, and in U.S. Pat. No. 4,092,530 entitled "Feedback Loop Control System Employing Method and Apparatus for Stabilizing Total Loop Gain and Bandwidth." A beam splitter 40, positioned outside of the ring laser cavity 10, provides a pair of low intensity light beams 42 and 44 which are utilized in the described control system.

Tipping Brewster plate 30 is described in co-pending patent application Ser. No. 39,018, by the same inventors, entitled "Vertex-mounted Tipping Brewster Plate for a Ring Laser," assigned to be the same assignee as the present invention.

From arguments of time-reversal symmetry in Maxwell's equations, it is clear that any "optical diode," or non-reciprocal device that treats a right-going light wave differently from a left-going wave, must involve the Faraday effect and a dc magnetic field. The direct effect of a Faraday cell with a longitudinal magnetic field, is to produce rotation of the plane of polarization of a linearly polarized input wave. The direction of rotation may be remembered by the mnemonic device of thinking of the Faraday cell as a rotating drum. This is illustrated figuratively in FIGS. 2A and 2B which shows important elements, also shown figuratively, of the ring laser 10 of FIG. 1. A Faraday cell, illustrated figuratively as a rotating drum in magnetic field B is inserted within the optical cavity. A beam entering from the right passes through the drum and has its polarization rotated out of the plane of FIG. 2A; a beam passing through from the left experiences a polarization rotation in the same direction, FIG. 2B.

Figure 2A:
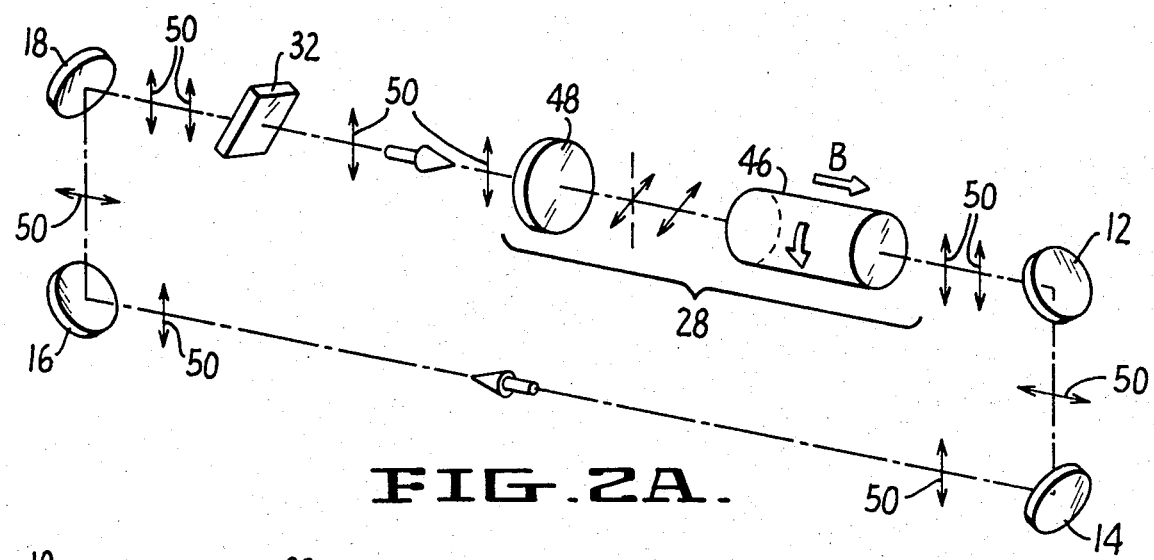
FIG. 2A is a figurative illustration of a ring laser showing the passage of a forward wave.
Figure 2B:
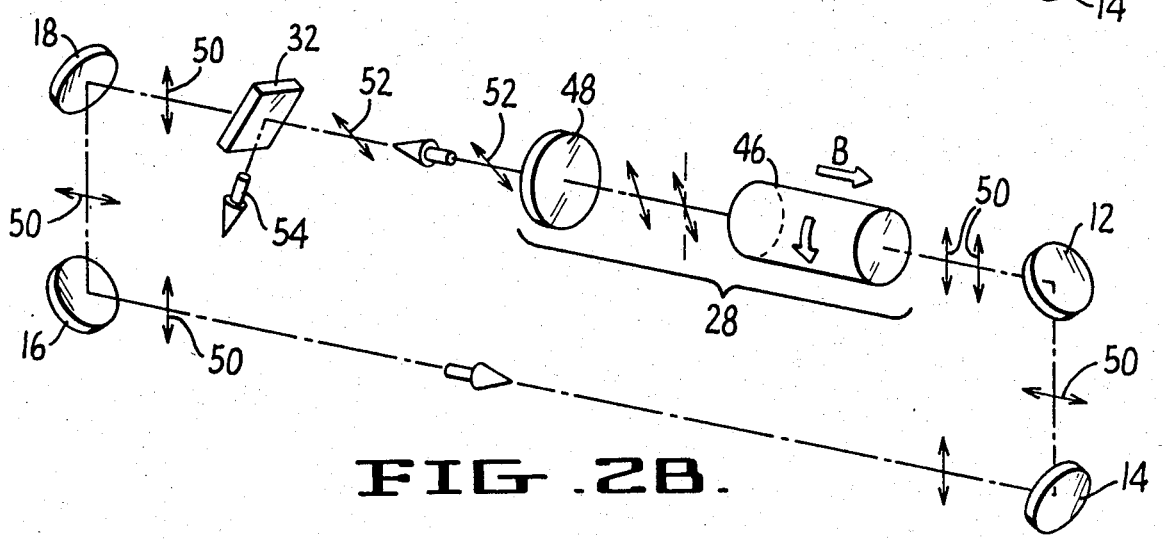
FIG. 2B is a figurative illustration of a ring laser showing the passage of a backward wave.

To produce the desired bias for the forward wave vs. the backward wave, a reciprocal polarization-rotating element 48 is added to "rotate back" the forward wave polarization into the plane of incidence of the Brewster plates 32 in the cavity. Together, in combination with magnetic field, B, these two elements form the optical diode 28. In FIGS. 2A and 2B the Brewster plate 32 is representative of the several Brewster surfaces within the ring laser optical cavity. The Brewster plates are the partial polarizers which "analyze" the beam's polarization. As a mnemonic means to remember the action of element 48, one may think of the action of this element as being like a screwthread. The beam polarization rotates as the beam propagates just as a screw does in advancing from either direction into a stationary nut.

Light polarized in the plane of incidence suffers zero reflection loss. Light polarized in this direction is illustrated by the transverse arrows 50. That component of polarization in the backward wave, shown in FIG. 2B, which is rotated out of the plane of incidence, illustrated by arrows 52, is reflected as a beam 54 off the Brewster plate 32 at approximately a 13% reflection coefficient per Brewster plate 32 surface.

It has been found that a small differential loss, of less than 1% additional cavity loss seen by the backward wave over that for the forward wave, is sufficient to allow the forward wave to be the dominant oscillation, saturate all of the gain in the dye jet, and suppress the oscillation of the backward wave.

Several possibilities exist for the choice of a reciprocal, "rotates-back" element. This can be a piece of crystal cut for optical activity, a liquid solution of an optically active molecule, like sugar, a back-to-back pair of Fresnel rhombs, or a piece of birefringent crystal with its crystal axis oriented so that it acts as a half-wave plate. By far, however, the simplest element to fabricate and easiest to use, due to the largest angular tolerances on input beam direction and crystal axis orientation, is an optically-active plate of quartz-crystal. This requires only the proper cut of the crystal, so that the refracted ray in the crystal propagates along the crystal optic axis within $\pm\frac{1}{2}°$.

A simple model useful for designing an optical diode is to assume that all of the light, whose polarization is rotated out of the incidence plane of the stack of intracavity Brewster plates is reflected out of the cavity and lost. In one actual ring dye laser, the Coherent Model 699, for example, there are eleven Brewster plates in the cavity and transmission of a beam of light polarized perpendicular to the incidence plane in a traversal of this stack of plates is $(0.87)^{22} = 4.7\%$. In other words, about 95% of the light is lost. Inside a ring cavity, of course, where the polarization of the laser beam which builds up and oscillates is determined in part by traversal of the optical diode, the proper way to calculate a forward or backward wave insertion loss is to find the eigenvalues of the optical system in question after the manner of Bloom. (See A. L. Bloom, *Journal of the Optical Society of America*, v. 64 (April '74) pp. 447–452.) This has been done for a couple of trial cases, which confirmed that the simple model is sufficiently accurate for engineering design purposes.

Let $X_F$ be the polarization rotation angle per transit of the Faraday cell, and $X_{OA}$ be the rotation per transit of the optically active crystal. For an initial E-field amplitude E in the forward wave, the amplitude of the out-of-plane polarization after transit of the optical diode is $(X_F - X_{OA})E$, where the angles are in radians and assumed small, so that the sine $(X_F - X_{OA}) \approx X_F - X_{OA}$.

By the simple model, the forward wave suffers an intensity loss after transit of the whole cavity, including the Brewster plates which is proportional to the square of the amplitude loss, or:

$$F = (\text{Forward wave loss}) = (X_F - X_{OA})^2. \quad (1)$$

The backward wave intensity loss is similarly:

$$B = (\text{Backward wave loss}) = (X_F + X_{OA})^2. \quad (2)$$

Thus the differential intensity loss, which determines the dominance of one traveling wave over the other in the buildup of oscillation in the cavity is:

$$D = (\text{Differential intensity loss}) = B - F = 4 X_{OA} X_F. \quad (3)$$

In accordance with the present invention, it has been determined that a practical minimum differential loss for design of a diode, which insures one-way oscillation in a ring dye laser in the face of the normal microphonic perturbations of the cavity, assembly tolerances on the orientations of optical components, fluctuations in pump laser power, interruptions of the dye lasing due to bubbles in the dye jet stream, etc., is approximately $D = 0.4\%$. The forward wave insertion loss should be kept low enough to not degrade the laser output power. A normally acceptable insertion loss for an intracavity optic is $F = 0.1\%$. With these two values and Eq. (1)-(3), the required rotation angles, and therefore the Faraday material choice, dimensions, and magnetic fields can be chosen to provide an optical diode of desired bandwith. This is now explained.

By setting equation (1) equal to the insertion loss choice of 0.1%, the maximum allowable difference (for all operating wavelengths of the diode) between Faraday and "rotates-back" angles is:

$$X_{OA} - X_F \leq 1.8°$$

If these two angles are equal, the minimum Faraday angle is $X_F = 1.8°$ also, which is determined by setting equation (3) equal to 0.4%.

Note that the optical losses relevant to the laser action go as the square of these angles, so that the physical parameters chosen for the diode are not terribly sensitive to the experimentally-determined value for the minumum differential loss. The size of the rotation angles involved, of about 2°, is comparable to the angular alignment tolerance for the angles of insertion of a Brewster plate in a cavity, to produce an acceptably small power loss. Thus, the minimum differential loss figure of 0.4% may be in part determined by the accuracy of definition of the incidence plane of the stack of intracavity Brewster plates. The diode rotation angles must be large enough to appreciably exceed the variation in angles of the individual incidence planes.

Note also that the criteria set forth above do not require a perfect match of $X_F$ and $X_{OA}$, and that a simple means of making the differential loss of a diode larger is to use an $X_{OA}$ as much larger than $X_F$ as the limit on the forward insertion loss will allow. This is accomplished easily since the magnitude of angular rotation is a function of the thickness of the optically active material, and since quartz crystal is easily cut to any desired thickness.

Materials producing a relatively large amount of rotation of polarization per unit length and per unit magnetic field strength have a high Verdet constant. Such materials also have a large optical absorption. Traditionally a figure of merit M for Faraday rotator materials has been $M = V/a$, the ratio of Verdet constant to absorption. For use intracavity in a laser where the optical power densities are very high, one can roughly account for the tendency of a thermal lens to form and refract light out of the laser beam in the same manner that thermal distortion of the jet stream in a dye laser has been treated, by multiplying the traditional figure of merit by $K/(dn/dt)$ to give M*. Here K is the thermal conductivity of the material, and $dn/dt$ its refractive index change with temperature.

Several glasses with Verdet constants varying by a factor of twenty are compared in Table 1 with estimates for both the ordinary, and intracavity figures of merit. The values are normalized to that for silica for ease of comparison. The values of absorption for silica and crystal quartz are so low they are difficult to measure and different samples vary in result by a factor of fifty. Thus, the average of the valves given in the references cited, is used.

While the values in the table are approximate, the most striking fact is that the figures-of-merit vary much less rapidly than the Verdet constant, with the exception of crystal quartz, discussed below. There is no intrinsically "best" material and one is free to pick the Faraday glass on the basis of other properties, such as high Verdet constant (giving a lower magnet cost) or a dispersion characteristic giving a wide operating wave length span.

TABLE 1

Ordinary and Intracavity Figures of Merit for Various Faraday Rotator Glasses[a].
Data is scaled to 541 nm and normalized to Silica[b], for which $V = 0.0166$ min G$^{-1}$ cm$^{-1}$ and $a = 0.0006$ cm$^{-1}$.

| GLASS | VERDET CONSTANT | M | M* |
|---|---|---|---|
| Silica | 1 | 1[b] | 1 |
| Crystal Quartz | 1.2 | 0.7[b] | 8.0 |
| BK-7 | 1.3 | 0.27 | 1.5 |
| SF-2 | 3.2 | 1.5 | 2.8 |
| SF-57 | 6.0 | 0.90 | ~0.8[d] |

TABLE 1-continued

Ordinary and Intracavity Figures of Merit for Various Faraday Rotator Glasses[a].
Data is scaled to 541 nm and normalized to Silica[b], for which
$V = 0.0166$ min $G^{-1}$ cm$^{-1}$ and a = 0.0006 cm$^{-1}$.

| GLASS | VERDET CONSTANT | M | M* |
|---|---|---|---|
| FR-5 | 21.1 | 0.42[c] | — |

[a] Data primarily from Schott optical glass catalog and A.I.P. Handbook.
[b] Pinnow and Rich, Appl. Optics 12 (May '73) 984, absorptions at 1.06 microns scaled as inverse-square of wavelength.
[c] Hoya Faraday Rotator Glass catalog
[d] Extrapolated from data on similar glasses.

Next the Faraday rotation is plotted as a function of wavelength for a value of magnetic-field-path-length product obtainable from the magnets to be used. This is shown in FIG. 3 as curve 56 for a 1.2 cm thick piece of Schott SF-2 flint glass Faraday material placed in a 3.6 KG—average—magnetic field, one of the better choices from Table 1. A thickness of quartz crystal is then chosen which gives an optical-activity rotation that matches the Faraday rotation within the 1.8° mismatch criterion over the wavelength range of operation, i.e., between 440 μm and 800 μm. The amount of rotation due to the quartz crystal is proportional to its thickness; the curve 58 chosen to match the SF-2 curve 56 is for a 0.18 mm thickness of crystal.

Both Faraday rotation for most glasses, and the optical activity of quartz varies roughly as the inverse square of the wavelength, as shown in FIG. 3. Consequently, the problem in making a diode with a broad wavelength coverage is twofold. On the short wavelength end of the spectrum where both of these angles are large, the problem is to limit the size of the mismatch in angles, to limit the forward wave insertion loss. The difference in rotations cannot exceed 18°. On the long wavelength end of the spectrum, the problem is having enough Faraday rotation to maintain the minimum 0.4% differential loss in the face of the inverse-fourth-power of wavelength variation of D, Equation (3). Differential loss is shown as curve 60 in FIG. 3. Lastly, the absorption of the Faraday glass, for the length chosen to fit the magnet stack, is plotted versus wavelength, curve 62, to be sure it stays acceptably low (less than 0.5%) to not seriously degrade the laser output power.

FIG. 3 shows that an SF-2 glass optical diode meets all of these criterion over the wavelength range 440 nm to 800 nm, about double the range of prior art diodes.

In accordance with another aspect of the present invention, both the Faraday glass 46' and optically active quartz plate 48' are mounted to intercept the laser beam 64 at Brewster's angle of incidence as shown in FIG. 4, so that the reflection losses for the beam at the exit and entrance faces of each plate are near zero, i.e., less than 0.3%. This requires that the crystal be cut and oriented in use to have the crystal axis in the plane of incidence within approximately ±½°, and at an angle of 57°, Brewster's angle for crystal quartz, with respect to the surface of the plate. Then the refracted ray in the crystal will propagate along the optic axis to within ±½°. The Faraday material 46' is surrounded by a group of five magnets 66.

In accordance with another aspect of the invention, the Faraday cell material, and optically active element are combined in one piece to make a unified diode. Two important beneficial results ensue from this arrangement.

First, the dispersion characteristics of the Faraday rotation, and the optical activity rotation angles are identical, and if these angles are made to match at any wavelength, they would match at all wavelengths. This is because both types of rotation arise from a difference of index of refraction for propagation of right-handed and left-handed circularly polarized light in the material, and they both are determined by the same indices. Thus, the forward-wave insertion loss is negligible for all wavelengths where the absorption of the medium is negligible.

Second, in the design of FIG. 4 where the Faraday cell 46' and thin crystal are separate plates at Brewster's angle, there is of necessity a non-zero reflection loss even for the forward wave. This occurs at the exit face of one plate, and at the entrance face of the second because between the plates the polarization has a component out of the incidence plane. At the blue limit of the optical diode of FIGS. 3 and 4, where this loss is greatest, it amounts to 0.3% per surface. The unified diode of FIG. 5 avoids this loss at all wavelengths by having the forward wave remain polarized in the incidence plane at both exit and entrance faces.

In an actual embodiment, shown in FIG. 5, this is accomplished by optically contacting a piece of left-handed optically active quartz crystal 68, to a similar piece 70 of right-handed crystal of slightly different thickness, to form a composite diode 72. The net optical activity of the diode 72 is that of a 0.18 mm length of a single-crystal piece (or 4° of rotation at 580 nm) even though the length of the total assembly is 2 cm. This construction for a unified diode is necessary because the Verdet constant of quartz is so low, that to increase the magnetic field to get the Faraday rotation up to 4° in a 0.18 mm length of crystal would require the impractically large field of 790 kG. The optical contact allows the Faraday material to be made longer, to accumulate more Faraday rotation in a practical magnetic field strength, without increasing the net optical activity. The effect of the optical activity is to have the polarization rotate 200° to the right in the right-handed piece of crystal 70, then enter the left-handed piece of crystal 68 and rotate to the left 196° to leave the desired, net 4° rotation. There is no reflection loss at the interface because of the optical contact.

Another advantage of the unified diode 72 is that by eliminating the thin-crystal piece of prior art diodes and the diode of FIG. 4, the weak, spurious, etalon-effect this thin element introduces into the cavity is removed. This weak etalon causes the output linewidth of the laser to fluctuate with tuning in the broadband operating mode, where the stronger etalons deliberately introduced to select a single oscillating frequency are removed.

The optical axes of the right and left-handed pieces 68 and 70 must be accurately parallel, which puts tight tolerances on the cutting of the crystal. Permanent magnets 74 surround the composite diode 72, and for a given magnet diameter, there is effectively a maximum field-times-path length product that can be attained by stacking-up magnets. The limit is reached approximately when the length of the magnet stack equals the magnet's diameter.

An additional 40% of field strength can be attained over the central, one-diameter length, by stacking on either end a stack of magnets oriented with field reversed, of a one-half diameter length, as shown by the plus and minus designations in FIGS. 4 and 5. With the highest performance permanent magnets commercially available, made of a samarium-cobalt mixture and of 3 cm diameter, the available field strength gives only two-thirds the Faraday rotation angle that is possible with the diode of FIG. 4.

Left-handed quartz crystal is available only in short lengths, commercially, and would impose about the same limit even if larger magnets were obtainable. Thus, the minimum differential loss requirement limits diode 72 to operation only out to a wavelength of 680 nm. Note that this requires more than twice as many magnets, which are the most expensive part of the diode even to achieve this performance. Where the unified diode 72 is very superior is at the blue end of the spectrum, where SF-2 glass of the embodiment of FIG. 4 absorbs light. Crystal quartz is transparent down to 200 nm, and Faraday rotation is no problem due to the inverse square law. Although presently known dyes for ring lasers do not operate at shorter wavelengths than 450 nm, this advantage will become more important in the future. These several practical problems make, for the time being, the diode of FIG. 4 the preferred embodiment, instead of the unified diode of FIG. 5.

The large intracavity figure of merit M* for crystal quartz arises because the thermal conductivity of crystal quartz is five times that of silica. If there were other crystal materials known which showed optical activity and were available in right-hand and left-handed forms and of good optical quality, they would be prime candidates for a unified diode.

What is claimed is:

1. An optical diode for a ring laser comprising means for providing a magnetic field; and a unitary member within the magnetic field comprising a piece of material exhibiting right-handed optical activity in optical contact with a piece of the same type of material having left-handed optical activity of slightly different length.

2. An optical diode for a ring laser comprising means for providing a magnetic field; and a unitary member within the magnetic field comprising a right-handed crystal quartz element in optical contact with a left-handed crystal quartz element of slightly different length.

3. A method of making a broadband diode for allowing a forward-wave to predominate over a backward wave in a ring laser, comprising a reciprocal polarization-rotating element having an angle of rotation of $X_{OA}$ and a Faraday element within a designated magnetic-field path-length product and having an angle of polarization rotation of $X_F$, comprising the steps of:

(a) specifying a maximum forward wave insertion loss which sets an upper limit on the difference $X_F - X_{OA}$;

(b) specifying a minimum differential loss between forward and backward waves, which sets a minimum on the product $4X_F X_{OA}$;

(c) choosing the Faraday element, the designated magnetic-field times path-length product, and the dimensions of the reciprocal polarization element to maximize the wavelength range over which the conditions of (a) and (b) are met, (d) combining the reciprocal polarization rotating element and the Faraday element into a single unified member comprising a section of material exhibiting right-handed optical activity, in optical contact with a section of the same type of material but which exhibits left-handed optical activity and is of slightly different length to produce the polarization rotation angle $X_{OA}$ as the net amount due to optical activity after traversing both sections of materials; and (e) placing said unified member in a magnetic field.

4. The method of claim 3 including the step of inserting the unified member at Brewster's angle of incidence to the ring laser beam.

5. The method of claim 3 or 4 wherein said optically active material is crystal quartz cut for optical activity.

6. A broadband optical diode for a ring laser comprising:

(a) A reciprocal polarization-rotating element having a reciprocal polarization rotation of $X_{OA}$, and (b) a Faraday element having a polarization rotation $X_F$ and wherein said reciprocal polarization-rotating element and Faraday element comprise a single unified member comprising a section of material exhibiting right-handed optical activity in optical contact with a similar section of the same type of material which exhibits left-handed optical activity and is of slightly different length to produce the polarization rotation angle $X_{OA}$ as the net amount due to optical activity after traversing both sections of material;

(c) means for providing a magnetic field through said Faraday element;

(d) and wherein the values of $X_{OA}$ and $X_F$ over the wavelength range satisfy the requirements that
(i) the forward wave insertion loss not exceed a maximum specified value; and
(ii) the differential loss between forward and backward traveling waves not be less than a minimum specified value.

7. A broadband optical diode as in claim 6 wherein the specified value for maximum forward wave insertion loss is about 0.1% and the specified value for minimum differential loss is about 0.4%.

8. A broadband optical diode as in claim 6 wherein $X_F - X_{OA}$ does not exceed approximately 1.8° and wherein $X_F$ is not less than approximately 1.8°.

9. A broadband optical diode as in claim 6 wherein said optically active material is crystalline quartz.

10. A broadband optical diode as in claim 6 wherein said unified member is at substantially Brewster's angle of incidence to the ring laser beam.

* * * * *

UNITED STATES PATENT AND TRADEMARK OFFICE
CERTIFICATE OF CORRECTION

PATENT NO. : 4,272,158
DATED : June 9, 1981
INVENTOR(S) : JOHNSTON, JR. et al.

It is certified that error appears in the above-identified patent and that said Letters Patent are hereby corrected as shown below:

Column 7, line 9, delete "catalogand" and add --catalog and--.

Column 7, line 10, change "12" to --$\underline{12}$--.

Column 7, line 11, delete "inverse-squareof" and add --inverse-square of--.

Column 8, line 39, change "net" to --$\underline{net}$--.

Signed and Sealed this

Seventeenth Day of November 1981

[SEAL]

Attest:

GERALD J. MOSSINGHOFF

Attesting Officer     Commissioner of Patents and Trademarks